United States Patent
Ell et al.

(10) Patent No.: US 10,559,213 B2
(45) Date of Patent: Feb. 11, 2020

(54) METHOD AND SYSTEM FOR AIRCRAFT TAXI STRIKE ALERTING

(71) Applicant: Rosemount Aerospace Inc., Burnsville, MN (US)

(72) Inventors: Todd Anthony Ell, Savage, MN (US); Robert Rutkiewicz, Edina, MN (US); Joseph T. Pesik, Eagan, MN (US)

(73) Assignee: Rosemount Aerospace Inc., Burnsville, MN (US)

(*) Notice: Subject to any disclaimer, the term of this patent is extended or adjusted under 35 U.S.C. 154(b) by 84 days.

(21) Appl. No.: 15/450,835

(22) Filed: Mar. 6, 2017

(65) Prior Publication Data

US 2018/0253983 A1 Sep. 6, 2018

(51) Int. Cl.
*G08G 5/04* (2006.01)
*H04N 7/18* (2006.01)
(Continued)

(52) U.S. Cl.
CPC ............... *G08G 5/04* (2013.01); *B64D 47/02* (2013.01); *B64D 47/08* (2013.01); *B64F 1/002* (2013.01); *G06K 9/00805* (2013.01); *G06K 9/2018* (2013.01); *G06K 9/2036* (2013.01); *G06T 7/521* (2017.01); *G06T 7/55* (2017.01);
(Continued)

(58) Field of Classification Search
None
See application file for complete search history.

(56) References Cited

U.S. PATENT DOCUMENTS 6,405,975 B1 6/2002 Sankrithi et al.
6,571,166 B1 5/2003 Johnson et al.
(Continued)

FOREIGN PATENT DOCUMENTS

CA 2464791 A1 10/2004
CA 2737189 A1 10/2011
(Continued)

OTHER PUBLICATIONS

Extended European Search Report, for European Patent Application No. 18160177.4, dated Jun. 8, 2018, 6 pages.
(Continued)

*Primary Examiner* — Frederick D Bailey
(74) *Attorney, Agent, or Firm* — Kinney & Lange, P.A.

(57) ABSTRACT

Apparatus and associated methods relate to ranging object(s) nearby an aircraft using triangulation of pulses of spatially-patterned light projected upon and reflected by the object(s). The projected pulses provide rapidly-changing illumination of a spatially patterned portion of the scene. A camera receives a reflected portion of the projected pulse and focuses the received portion onto a plurality of light-sensitive pixels, thereby forming a pulse image. The pulse image includes pixel data indicative of a rate of change of light intensity focused thereon exceeding a predetermined threshold. Pixel coordinates, corresponding to a subset of the plurality of light-sensitive pixels that are indicative of the rate of change of light intensity exceeding a predetermined threshold, are identified. Trajectory and/or range data of object(s) in the scene are calculated, based on a projector location, a camera location, and the identified pixel coordinates.

20 Claims, 5 Drawing Sheets

(51) Int. Cl.
*H04N 5/33* (2006.01)
*H04N 5/225* (2006.01)
*B64D 47/08* (2006.01)
*G08G 5/06* (2006.01)
*G06K 9/20* (2006.01)
*B64F 1/00* (2006.01)
*G06K 9/00* (2006.01)
*B64D 47/02* (2006.01)
*G06T 7/55* (2017.01)
*G06T 7/521* (2017.01)

(52) U.S. Cl.
CPC .............. *G08G 5/06* (2013.01); *H04N 5/2256* (2013.01); *H04N 5/33* (2013.01); *H04N 7/183* (2013.01)

(56) References Cited

U.S. PATENT DOCUMENTS

| | | | |
|---|---|---|---|
| 6,754,370 B1 | 6/2004 | Hall-Holt et al. | |
| 7,592,929 B2 | 9/2009 | Pepitone | |
| 7,974,773 B1 | 7/2011 | Krenz et al. | |
| 9,007,438 B2 | 4/2015 | Mestha et al. | |
| 9,047,771 B1* | 6/2015 | Thoreen | G08G 5/0021 |
| 9,091,748 B2 | 7/2015 | Kennedy et al. | |
| 9,174,746 B1 | 11/2015 | Bell et al. | |
| 9,245,450 B1 | 1/2016 | Chiew et al. | |
| 9,401,094 B2 | 7/2016 | Cros et al. | |
| 2007/0241936 A1 | 10/2007 | Arthur et al. | |
| 2008/0012850 A1* | 1/2008 | Keating, III | H04N 13/254 345/419 |
| 2010/0094487 A1 | 4/2010 | Brinkman | |
| 2011/0024611 A1* | 2/2011 | Cunningham | H01L 27/14601 250/252.1 |
| 2011/0032508 A1* | 2/2011 | Ludwig | G01S 17/36 356/5.01 |
| 2012/0320157 A1* | 12/2012 | Junuzovic | G03B 15/05 348/46 |
| 2013/0195344 A1* | 8/2013 | Marquiss | G01N 21/6454 382/133 |
| 2013/0222551 A1 | 8/2013 | Shamir et al. | |
| 2014/0092206 A1 | 4/2014 | Boucourt et al. | |
| 2014/0218527 A1* | 8/2014 | Subramanya | G08G 1/143 348/148 |
| 2015/0142214 A1 | 5/2015 | Cox et al. | |
| 2015/0281612 A1 | 10/2015 | Lund et al. | |
| 2015/0304577 A1* | 10/2015 | Ligozat | H04N 5/2226 348/308 |
| 2016/0211814 A1 | 7/2016 | Lin et al. | |
| 2016/0293647 A1 | 10/2016 | Lin et al. | |
| 2016/0342232 A1 | 11/2016 | Sargent et al. | |
| 2016/0364612 A1* | 12/2016 | Dixon | H04N 7/181 |
| 2017/0067734 A1* | 3/2017 | Heidemann | G01B 11/2513 |
| 2017/0301250 A1 | 10/2017 | Ell et al. | |
| 2017/0334578 A1 | 11/2017 | Fleck et al. | |

FOREIGN PATENT DOCUMENTS

| | | |
|---|---|---|
| CN | 105391975 A | 3/2016 |
| EP | 0980828 A1 | 2/2000 |
| EP | 1842772 A2 | 10/2007 |
| EP | 1927965 A2 | 6/2008 |
| EP | 2426461 A2 | 3/2012 |
| EP | 2495168 A1 | 9/2012 |
| EP | 2565861 A2 | 3/2013 |
| EP | 2685442 A2 | 1/2014 |
| EP | 3235735 A1 | 10/2017 |
| WO | 2009010969 A2 | 1/2009 |
| WO | 2017009848 A1 | 1/2017 |

OTHER PUBLICATIONS

International Civil Aviation Organization, "Aerodrome Standards: Aerodrome Design and Operations", ICAO: Cooperative Development of Operational Safety and Continuing Airworthiness, dated Jul. 1999, 194 pages.

International Civil Aviation Organization, "Airport Markings: ICAO & U.S. Requirements", ICAO: Federal Aviation Administration, dated Jun. 2012, 19 pages.

U.S. Department of Transporation, "Advisory Circular", U.S. DOT: Federal Aviation Administration, dated Sep. 27, 2013, 144 pages.

Xu, Lun Hui et al., "A New Lane Department Warning Algorithm Considering the Driver's Behavior Characteristics", Hindawi Publishing Corporation: Mathematical Problems in Engineering, dated Jul. 26, 2015, 12 pages.

Federal Aviation Administration, "A Quick Reference to Airfield Standards", FAA: Southern Region Airports Division, dated Jan. 2018, 69 pages.

* cited by examiner

METHOD AND SYSTEM FOR AIRCRAFT TAXI STRIKE ALERTING

BACKGROUND

Each year, significant time and money are lost due to commercial aircraft accidents and incidents during ground operations, of which significant portions occur during taxiing maneuvers. During ground operations, aircraft share the taxiways with other aircraft, fuel vehicles, baggage carrying trains, mobile stairways and many other objects. Aircrafts often taxi to and/or from fixed buildings and other fixed objects. Should an aircraft collide with any of these objects, the aircraft must be repaired and recertified as capable of operation. The cost of repair and recertification, as well as the lost opportunity costs associated with the aircraft being unavailable for use can be very expensive.

Pilots are located in a central cockpit where they are well positioned to observe objects that are directly in front of the cabin of the aircraft. Wings extend laterally from the cabin in both directions. Some commercial and some military aircraft have large wingspans, and so the wings on these aircraft laterally extend a great distance from the cabin and are thus positioned behind and out of the field of view of the cabin. Some commercial and some military planes have engines that hang below the wings of the aircraft. Pilots, positioned in the cabin, can have difficulty knowing the risk of collisions between the wingtips and/or engines and other objects external to the aircraft. An aircraft on-ground collision alerting system would be useful to survey the area forward or aft of the tail, wingtips and/or engines, to detect obstructions in a potential collision path, and to provide visual and audible alerts to the cockpit.

SUMMARY

Apparatus and associated methods relate to a system for calculating trajectory and/or range data of object(s) external to an aircraft. The system includes a light projector configured to be mounted at a projector location on the aircraft and to project pulses of spatially-patterned light from the light projector onto a scene external to the aircraft, thereby providing rapidly-changing illumination of a spatially-patterned portion of the scene. The system includes a camera configured to be mounted at a camera location on the aircraft and to receive a portion of the projected pulses of spatially-patterned light reflected by the scene. The camera is further configured to focus the received portion onto a focal plane array comprising a plurality of light-sensitive pixels. The camera has a pulse-mode in which the camera forms a pulse image comprising pixel data generated by the plurality of light-sensitive pixels. The pixel data is indicative of a rate of change of light intensity focused thereon exceeding a predetermined threshold. The system also includes an image processor configured to identify pixel coordinates corresponding to a subset of the plurality of light-sensitive pixels indicative of the rate change of light intensity focused thereon exceeding a predetermined threshold. The image processor is further configured to calculate, based on the projector locations of the light projector, the camera location of the camera and the identified pixel coordinates, trajectory and/or range data of object(s) in the scene from which the spatially-patterned light projected by the light projector is reflected.

Some embodiments relate to a method for generating an alert signal of a potential aircraft collision. The method includes projecting pulses of spatially-patterned light from the light projector onto a scene external to an aircraft, thereby providing pulsed illumination of a spatially-patterned portion of the scene. The spatially-patterned portion of the scene thereby receives a rapid change in illumination. The method includes receiving a portion of the projected pulses of spatially-pattern light reflected by the scene. The method includes focusing the received portion onto a focal plane array comprising a plurality of light-sensitive pixels. The method includes forming a pulse image indicative of a change of light intensity exceeding a predetermined threshold. The pulse image includes pixel data generated by the plurality of light-sensitive pixels. The method includes identifying pixel coordinates corresponding to a subset of the plurality of light-sensitive pixels that are indicative of the rapid change of light intensity exceeding a predetermined threshold. The method also includes calculating, based on the projector locations of the light projector, the camera location of the camera and the identified pixel coordinates, trajectory and/or range data of object(s) in the scene from which the spatially-patterned light projected by the light projector is reflected.

DETAILED DESCRIPTION

Apparatus and associated methods relate to ranging object(s) nearby an aircraft using triangulation of pulses of spatially-patterned light projected upon and reflected by the object(s). The projected pulses provide rapidly-changing illumination of a spatially patterned portion of the scene. A camera receives a reflected portion of the projected pulse and focuses the received portion onto a plurality of light-sensitive pixels, thereby forming a pulse image. The pulse image includes pixel data indicative of a rate of change of light intensity focused thereon exceeding a predetermined threshold. Pixel coordinates, corresponding to a subset of the plurality of light-sensitive pixels that are indicative of the rate of change of light intensity exceeding a predetermined threshold, are identified. Trajectory and/or range data of object(s) in the scene are calculated, based on a projector location, a camera location, and the identified pixel coordinates.

In some embodiments, pulse images of the object are captured both with and without pulsed illumination by the spatially-patterned light. A difference between these two pulse images can be used to help isolate the reflections of the spatially-patterned light, by removing persistent sources of rapidly-changing light (e.g., a flashing beacon). In some embodiments, the camera is further configured to generate standard-contrast images in which light is integrated over an exposure time. Standard-contrast images can be used in conjunction with the pulse images. For example, standard images may be presented to a pilot annotated by range data captured by the pulse images. Standard images can be used in conjunction with the pulse images to identify pixel boundaries of the object and to calculate range values of portions of the object corresponding to pixels imaging the spatially-patterned light projected onto the scene. For pixels imaging reflections of the spatially-patterned light, triangulation can be used to calculate range. For pixels not imaging reflections of the spatially-patterned light, range can be calculated using one or more calculated ranges corresponding to nearby pixels imaging the spatially-patterned light reflected from the object. Using these two ranging techniques provides pixel level resolution of trajectory and/or range data, while requiring only sparse illumination of objects by spatially-patterned light.

Figure 1:
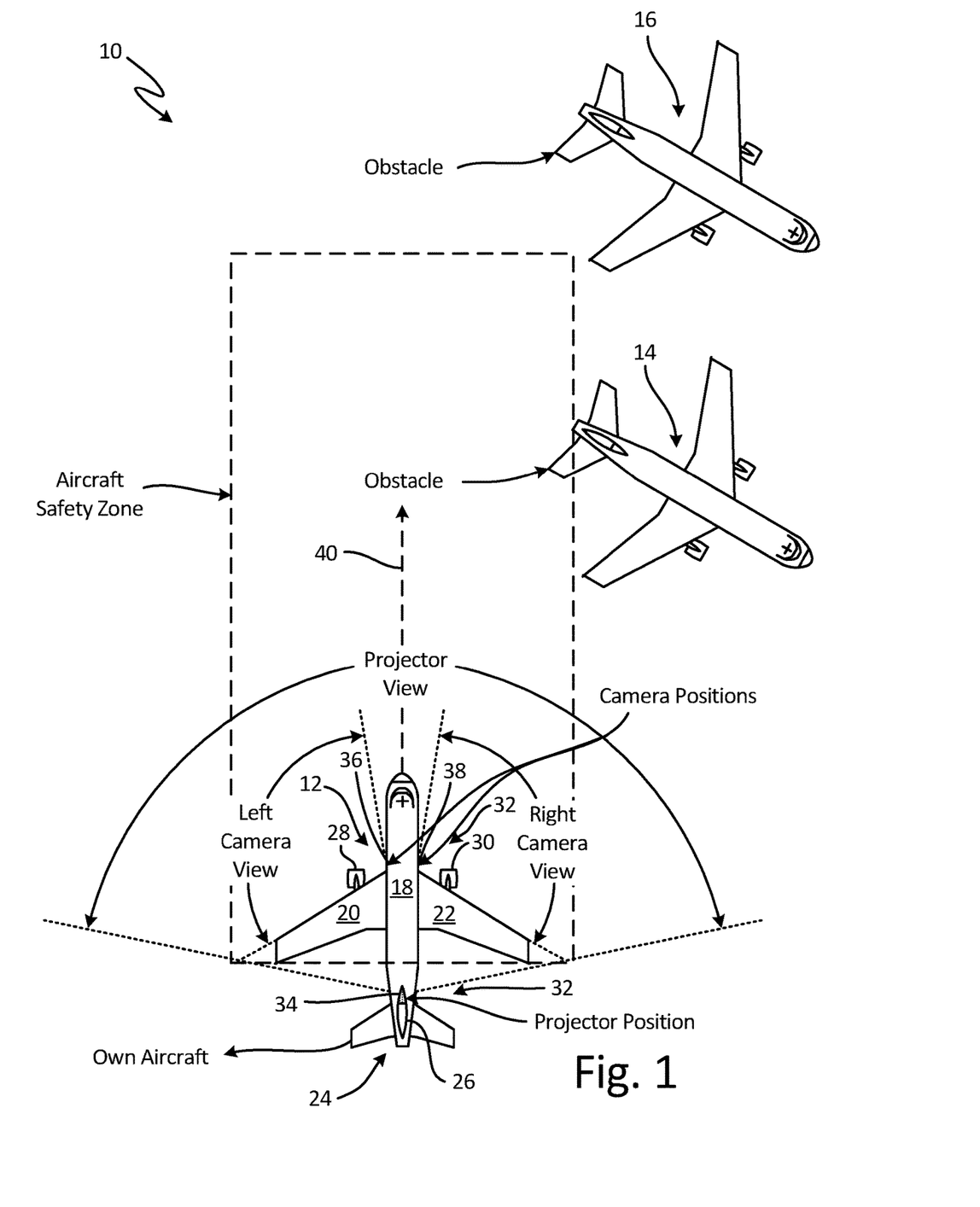
FIG. 1 is a schematic view of an exemplary aircraft collision alerting system used by an aircraft during on-ground operations.

FIG. 1 is a schematic view of an exemplary aircraft collision alerting system used by a taxiing aircraft. In FIG. 1, aircraft taxi scenario 10 includes taxiing aircraft 12 and two parked aircraft 14, 16. Taxiing aircraft 12 has cabin 18, left wing 20, right wing 22 and tail 24. Tail 24 has vertical stabilizer 26. Left engine 28 hangs from left wing 20, and right engine 30 hangs from right wing 22. Taxiing aircraft 12 is equipped with one embodiment of aircraft collision alerting system 32. Aircraft collision alerting system 32 includes light projector 34, left-side camera 36, and right-side camera 38. In the depicted embodiment, light projector 34 is mounted on vertical stabilizer 26 of tail 24. Light projector 34 is configured to project pulses of spatially-patterned light onto a scene external to taxiing aircraft 12, thereby providing rapidly-changing illumination of a spatially-patterned portion of the scene. The scene may include objects nearby and external to taxiing aircraft 12. Light projector 34 can be mounted at other locations on taxiing aircraft 12 in other embodiments.

Light projector 34 projects the pulses of spatially-patterned light over a solid angle of illumination. The projected pulses of spatially-patterned light illuminate objects that reside within the solid angle of illumination. In the depicted embodiment, light projector 34 has an optical axis that is coplanar with cabin axis 40 of taxiing aircraft 12. Light projector 34 is shown illuminating objects that are within an azimuthal range of +/−85 degrees, for example, of cabin axis 40 of taxiing aircraft 12, and within an elevation range of a projection horizon of light projector 34. The elevation range of projection, for example, can be from about +3, +5, +10, +12, or +15 degrees to about −2, −5, −8, or −10 degrees of projection from a vertical location of light projector 34, sufficient to encompass the wingtips of left wing 20 and right wing 22, as well as a plane extending forward of these wingtips parallel to cabin axis 40.

In some embodiments, the projected pulses of spatially-patterned light can intermittently illuminate objects within the solid angle of illumination. Such illumination may use light of various wavelengths. For example, in some embodiments, infrared light, being invisible to humans, can be used to provide illumination of objects within the solid angle of illumination. Infrared light can advantageously be non-distractive to pilots and to other people upon whom the pulses of spatially-patterned light is projected. In some embodiments, a temporal change in the intensity of the illuminating pulses is controllable. Such temporal changes in the intensity of illuminating pulses can be controlled, for example, by controlling a rise time and/or a peak power of the illuminating pulses.

In some embodiments, the spatially-patterned light is pulsed for a limited time, with image capture synchronized with the projector illumination. In some embodiments, left-side camera 36 and right-side camera 38 are synchronized with light projector 34. Left-side camera 36 and right-side camera 38 are configured with a pulse mode in which pulse images, which are indicative of a measure of a rate of change of light incident on a focal plane array, are generated. In some embodiments, such pulse images can be binary images, in which pixels indicate a binary condition. One exemplary binary condition may be whether the rate of change of light intensity incident upon each pixel is greater than a predetermined threshold. Pixels upon which the incident light intensity changes at a rate greater than the predetermined threshold may indicate such a condition by producing a signal of a first state. Pixels upon which the incident light intensity changes at a rate not greater than the predetermined threshold may indicate such a condition by producing a signal of a second state. In some embodiments, the threshold used in comparison with the temporal change in light intensity is controllable.

Such pulse-mode operation can advantageously permit low-power pulsing of the spatially-patterned light. Because the pulse images are indicative of changes in light intensity, a pulse can be very short in duration and still provide rapidly-changing illumination. The synchronized exposure timings of the pulse images can be correspondingly short in duration. The synchronized exposures timings should include at least a rapidly-changing beam-intensity portion of each of the projected pulses. Such short duration exposures reduce the amount of light from sources other than light projector 34 from being received and focused on the focal plane array.

In some embodiments, left-side camera 36 and right-side camera 38 are also configured with a normal mode in which standard-contrast images are generated. Standard-contrast images are indicative of a measure of integrated light intensity over an exposure time. Each pixel of a focal plane array may generate a word of data indicative of the light intensity integrated over the exposure time. In some embodiments, the word depth can be eight, sixteen, twenty-four, or thirty-two bits, or other numbers of bits. The larger word depths are capable of providing data indicative of finer resolutions than the smaller word depths. The standard-contrast images can be used in conjunction with the pulse images as will be explained below.

In some embodiments, light having wavelengths within an atmospheric absorption band can be used. Careful selection of projector wavelength can permit light projector 34 to compete less with the solar energy. There are, however, certain wavelengths where the atmospheric absorption is so great that both projector energy and solar energy are attenuated equally. Light is broadband as emitted from the sun with a maximum intensity falling in the visible light spectrum. Sunlight having wavelengths within the infrared spectrum is of lower intensity than the visible band. And so, projected light having such wavelengths need not compete with the sunlight. Using light having such wavelengths can thereby permit reduced power levels in projecting pulses of spatially-patterned light. Atmospheric absorption bands may further reduce solar infrared illumination. For example, atmospheric absorption bands include infrared wavelengths of between about 1.35-1.4, 1.8-1.95, 2.5-2.9, and 5.5-7.2 microns.

The pulses of spatially-patterned light that are projected by light projector 34 can be identified in images formed by cameras 36, 38. Using knowledge of the location from which the pulses were projected (e.g., the location of image projector 34), the location of the cameras 36, 38 and the location within the pulse images (e.g., pixel coordinates) where the feature is imaged can permit location determination using triangulation. For example, light projector 34 can be located at an elevation on taxiing aircraft 12 that is higher than an elevation where cameras 36, 38 are located. A location of the imaged feature can be used to determine trajectory and/or range data (e.g., distance) to the object(s) from which that specific feature is reflected.

Light projector 34, for example, can emit a structured beam of light to produce a pattern that, when reflected from a screen having a normal direction to cabin axis 40, is imaged as horizontal lines by cameras 36 and 38. One structured beam might be projected at an angle of elevation of zero degrees (i.e., directed parallel to the horizon). A second structured beam might be projected at an angle of negative five degrees from the horizon (i.e., directed at a slightly downward angle from light projector 34). Each of these projected structured beams of light, when reflected from an object, will be imaged at a different vertical location (e.g., each will have a different vertical pixel coordinate) within the camera image, depending on the range distance between the reflecting object and taxiing aircraft 12. Knowing the elevation of light projector 34, the elevations of cameras 36, 38, the specific feature of the projected pulses of spatially-patterned light (e.g., which horizontal line is imaged), and the location within the camera image where the specific feature is imaged can permit a determination of the range of the object from which the specific feature has been reflected.

Using the calculated range information, pilots taxiing aircraft 12 can be informed of any potential collision hazards within the scene illuminated by light projector 34. Pilots of taxiing aircraft 12 can steer aircraft 12 to avoid wingtip collisions and/or engine collisions based on the trajectory and/or range information that is calculated by aircraft collision alerting system 32.

Figure 2:
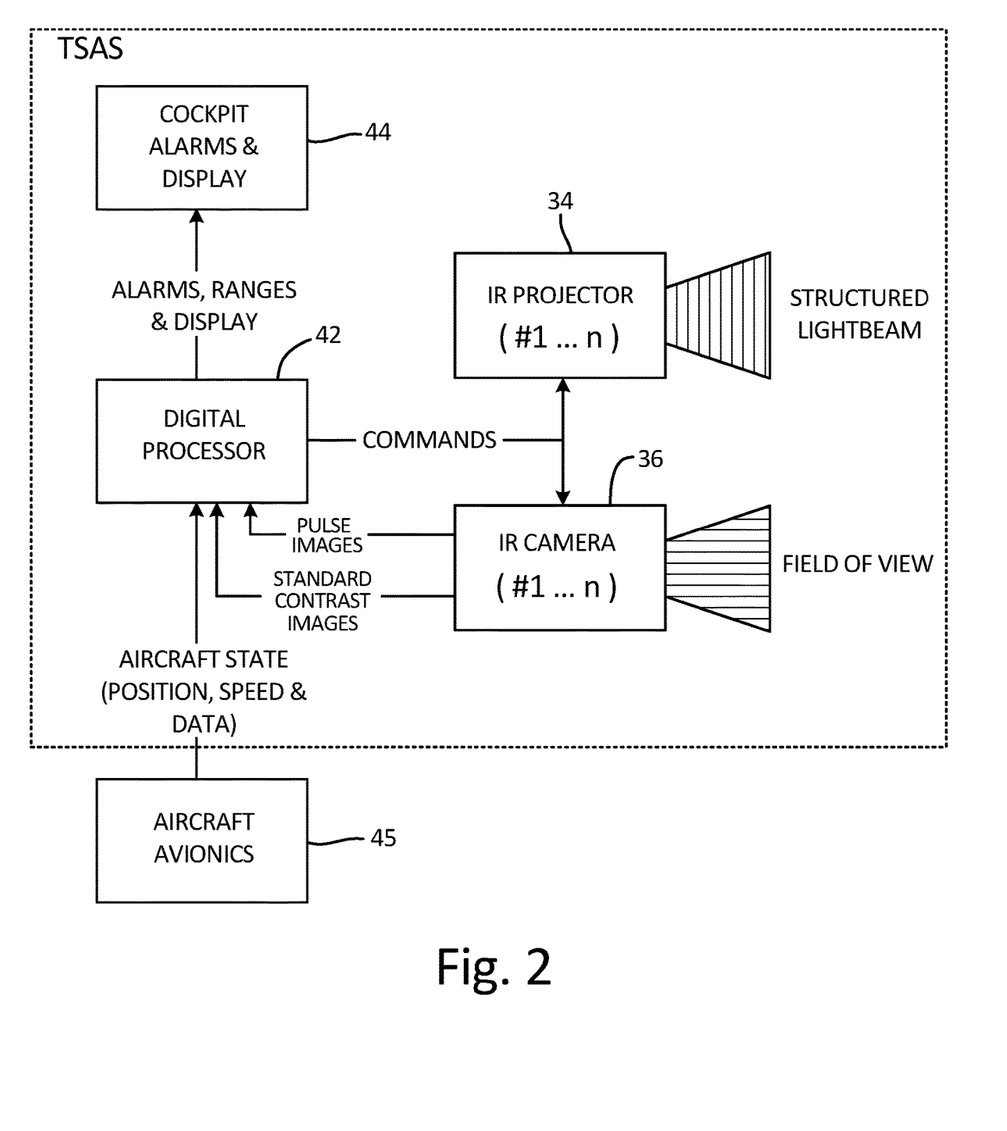
FIG. 2 is a block diagram of an exemplary aircraft collision alerting system.

FIG. 2 is a block diagram of an exemplary aircraft collision alerting system. Aircraft collision alerting system 32 includes infrared light projector(s) 34, camera(s) 36, image processor 42, and cockpit alarm and display module 44. Infrared light projector(s) 34 is configured to be mounted at a projector location on an aircraft. Infrared light projector(s) 34 is further configured to project spatially-patterned light from infrared light projector(s) 34 onto a scene external to the aircraft, thereby illuminating a spatially-patterned portion of the scene.

Camera(s) 36 is configured to be mounted at one or more camera locations on the aircraft. Camera(s) 36 is further configured to receive light reflected from the scene. Camera(s) 36 is further configured to focus the received light onto a focal plane array comprising a plurality of light-sensitive pixels, thereby forming an image of the scene. The image can include pixel data generated by the plurality of light-sensitive pixels. In the depicted embodiment camera(s) 36 generates a pulse image and a standard-contrast image.

Digital processor 42 receives inputs from camera(s) 36 and from aircraft avionics 45. Digital processor 42 generates commands that control the operation of infrared light projector(s) 34 and camera(s) 36. Digital processor 42 outputs alarms, calculate ranges of object(s), and images to cockpit alarms and display module 44. Digital processor 42 is configured to identify pixel coordinates corresponding to a subset of the plurality of light-sensitive pixels upon which the spatially-patterned light projected by infrared light projector(s) 34 and reflected from the spatially-patterned portion of the scene is focused. Digital processor 42 is further configured to use triangulation, based on the projector location of infrared light projector(s) 34, the location(s) of camera(s) 36 and the identified pixel coordinates corresponding to pixels receiving rapidly-changing light intensities, to calculate range value data of object(s) in the scene from which the spatially-patterned light projected by infrared light projector(s) 34 is reflected.

Figure 3:
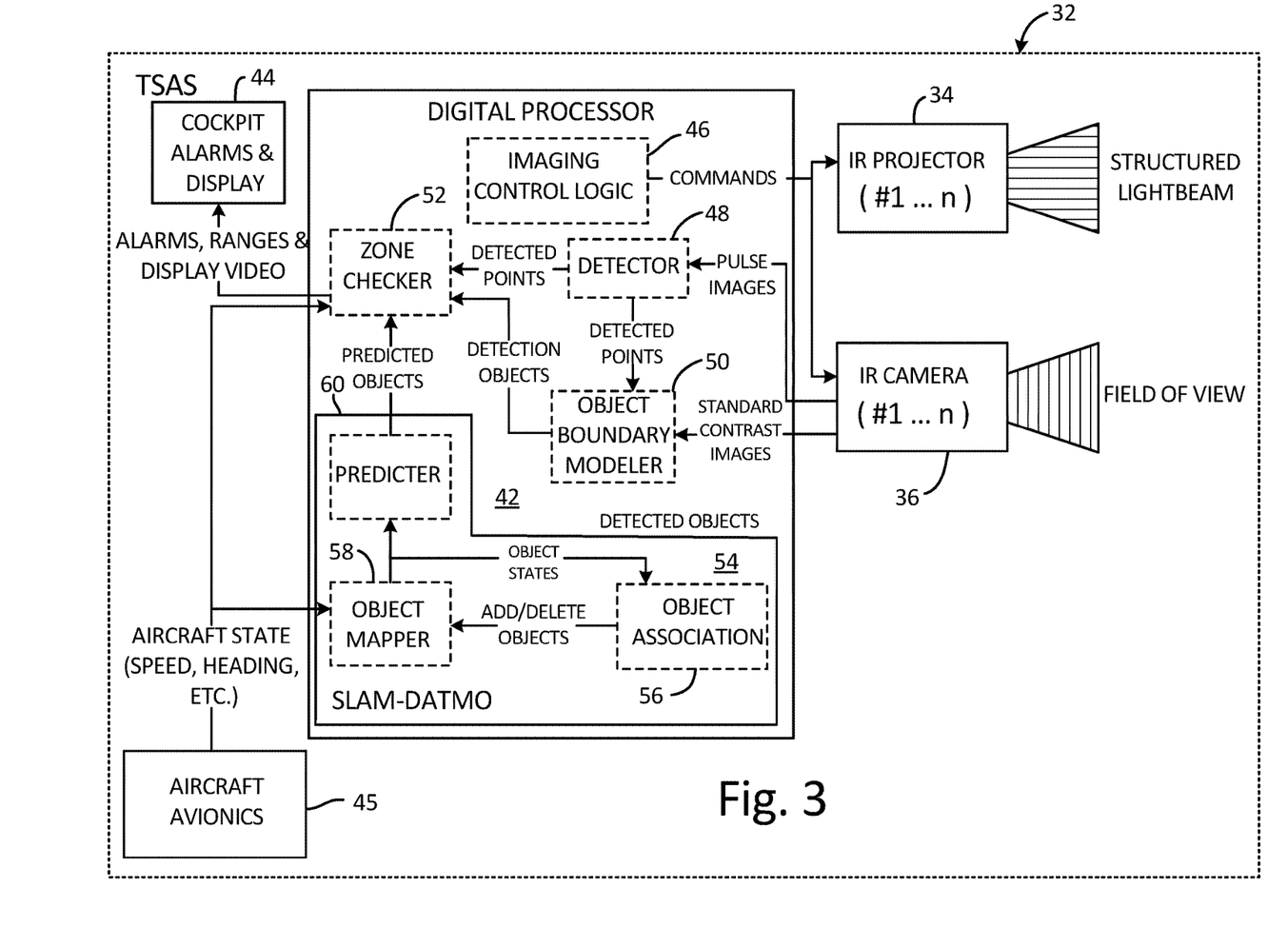
FIG. 3 is a detailed block diagram of the exemplary aircraft collision alerting system depicted in FIG. 2.

FIG. 3 is a detailed block diagram of the exemplary aircraft collision alerting system depicted in FIG. 2. Aircraft collision alerting system 32 includes infrared light projector(s) 34, camera(s) 36, image processor 42, and cockpit alarm and display module 44. Infrared light projector(s) 34 is configured to be mounted at a projector location on an aircraft. Infrared light projector(s) 34 is further configured to project pulses of spatially-patterned light from infrared light projector(s) 34 onto a scene external to the aircraft, thereby providing rapidly-changing illumination of a spatially-patterned portion of the scene. Image processor 42 is shown in greater detail than shown in FIG. 2.

Image processor 42 includes imaging control logic 46, detector 48, object boundary modeler 50, zone checker 52 and Simultaneous Localization And Mapping (SLAM) and Detection And Tracking of Moving Objects (DATMO) module 54. Imaging control logic 46 can generate commands that control operation of infrared light projector(s) 34 and camera(s) 36. For example, imaging control logic 46 can control a timing of when infrared light projector(s) 34 generates pulses of spatially-patterned light and projects the pulses of spatially-patterned light upon a scene external to the aircraft. Imaging control logic 46 can be configured to control a peak intensity of the pulses and a rise time for the pulses, the rise time being the time interval in which the intensity of the pulse changes from zero power to peak power. Imaging control logic 46 can be configured to direct infrared light projector(s) 34 to emit different pulse intensities and pulse rise times into different areas of the spatial pattern. Imaging control logic 46 can adjust the the intensities of the projected pulses so as to compensate, for example, for distances to objects, surface angles of objects, and/or reflectivities of objects. Imaging control logic 46 can control a timing of when camera(s) 36 generates images of the scene (e.g., pulse images and/or standard-contrast images). Such timing coordination can be used to ensure that images generated by camera(s) 36 contain and/or exclude the pulses of spatially-patterned light projected from infrared light projector(s) 34, for example.

Detector 48 is configured to receive the pulse images generated by camera(s) 36. Detector 48 is further configured to identify locations within the received pulse images that include light of the projected pulses of spatially-patterned light reflected from an object in the scene. Detector 48 is further configured to identify the specific features of the pulses of spatially-patterned light corresponding to the identified locations. For example, detector 48 may identify a first subset of the plurality of pixels of the image as being associated with a first horizontal line, and a second subset of the plurality of pixels with a second horizontal line.

Detector 48 can use pulse image pairs in identifying locations within the received images that include light of the projected pulses of spatially-patterned light reflected from an object in the scene. For example, a first image of the received image pair can be generated by camera(s) 36 at a time when infrared light projector(s) 34 is providing pulsed illumination of the scene. A second image of the received image pair can be generated by camera(s) 36 at a time when infrared light projector(s) 34 is not providing pulsed illumination of the scene. These first images of the received image pairs thereby contain light projected by infrared light projector(s) 34 and reflected from the objects in the scene.

Conversely, the second images of the received image pairs do not contain light projected by infrared light projector(s) 34 and reflected from the objects in the scene, but only light reflected from the objects that is projected thereon from other sources or light emitted from various sources in the scene. Detector 48 can generate a difference image based on a difference between the first and second images of each image pair. This technique can at least partially reduce the pixel response of light produced by sources other than infrared light projector(s) 34. In some embodiments, negative values generated by taking the difference between the first and second images of these image pairs are set to zero.

Various methods for identifying the features imaged by camera(s) 36 can be used. In some embodiments, each feature is encoded by modulating the intensity of that feature in the time domain and/or in the spatial domain. For example, each horizontal line can be encoded in the time domain using pulse rise-time modulation and/or pulse peak modulation. In some embodiments, each horizontal line can be encoded differently in the spatial domain as different dashed patterns, for example. In some embodiments each feature may be illuminated at a different time. Multiple images can be generated by the camera, so as to sequentially capture each of the separately timed features. In some embodiments, different frequencies of light can be used for different features.

Object boundary modeler 50 receives the pulse locations identified by detector 50. Object boundary modeler 50 also receives the passive images (e.g., those images that do not contain light projected by infrared light projector(s) 34) from camera(s) 36. Object boundary modeler 50 determines pixel boundaries of various objects imaged in passive images received by camera(s) 36. Object boundary modeler 50 may use local groupings of the received pulse locations and the corresponding calculated ranges corresponding to these pulse locations to identify separate structures or a continuum of a single structure. For example, local groupings of identified pulse locations that have similar corresponding locations might be associated with a common object. The passive image can be processed using various boundary and/or edge detection algorithms to identify potential object boundaries. Local groupings having similar corresponding calculated ranges can be used to annotate objects with identified boundary edges. The passive images with identified boundary edges can be used to show the spatial extent of the ranged objects. Object boundary modeler can be used to interpolate the range of every pixel within the identified boundary edges using the nearby members of the grouping of calculated ranges.

Zone checker 52 receives the identified boundaries of ranged objects from object boundary modeler 50. Zone checker 52 then compares the trajectory and/or range of such objects with the taxi path of taxiing airplane 12 and determines a collision risk score. If, for example, the collision risk score exceeds a predetermined value, then zone checker 52 may generate an alert signal and output it to cockpit alarms and display module 44. Zone checker 52 may also output passive images annotated with range values corresponding to detected objects for visual display on a display screen of cockpit alarms and display module 44.

Zone checker 52 can use a zone or multiple zones in determining a risk score. A zone, for example, can be a keep-out box surrounding the aircraft or some portion of the aircraft. Any object detected to be within the keep-out zone can cause zone checker 52 to generate an alert signal. In some embodiments, a series of zones around key aircraft components may be used, such as, for example, around wing-tips and/or engines. These zones can extend above and/or below the occupied region of these aircraft components to include a safety margin in elevation. These zones can also extend forward/aft or inboard/outboard of the aircraft components to provide safety margin in the direction of a plane trajectory. A volume of an audible alert signal can be adapted to the closing speed and/or range of the objects which are on a collision course with taxiing aircraft 12. For example, a risk score may be increased for an object in a forward zone as the speed of taxiing aircraft 12 increases. In some embodiments, a lateral danger zone for objects located laterally from the wingtips of taxiing aircraft 12 can be reduced as taxiing aircraft 12 slows down to permit the pilot to crawl past objects in tight quarters.

SLAM-DATMO module 54 is configured to track the detected and ranged objects. SLAM-DATMO module 54 receives the object boundaries detected by object boundary modeler 50 and receives the location values of such objects as inputs. In some embodiments, SLAM-DATMO module 54 also receives the passive images generated by camera(s) 36. SLAM-DATMO module 54 includes object association module 56, object mapping module 58, and predictor module 60. Object association module 56 associates detected objects in a current frame of a passive image with corresponding detected objects in a previous frame of a passive image. Using different frames of passive images, SLAM-DATMO module 54 can track a lateral movement (e.g., in the x and y pixel coordinate directions) and the range movement (e.g., toward or away from taxiing aircraft 12) of the detected objects. Using aircraft inputs, SLAM-DATMO module 54 can determine if the detected objects are stationary or moving. This information, in conjunction with outputs from object body modeler 50, can enhance ability to characterize object type. Predictor 60 can then use this information along with the past and current movements of the detected objects to predict future ranges and movements of these detected objects. Predictor 60 can then output these future predictions to zone checker 52 for use in identifying a collision risk score. In some embodiments, predictor 60 can predict a time to impact of the aircraft and the detected objects.

Figure 4:
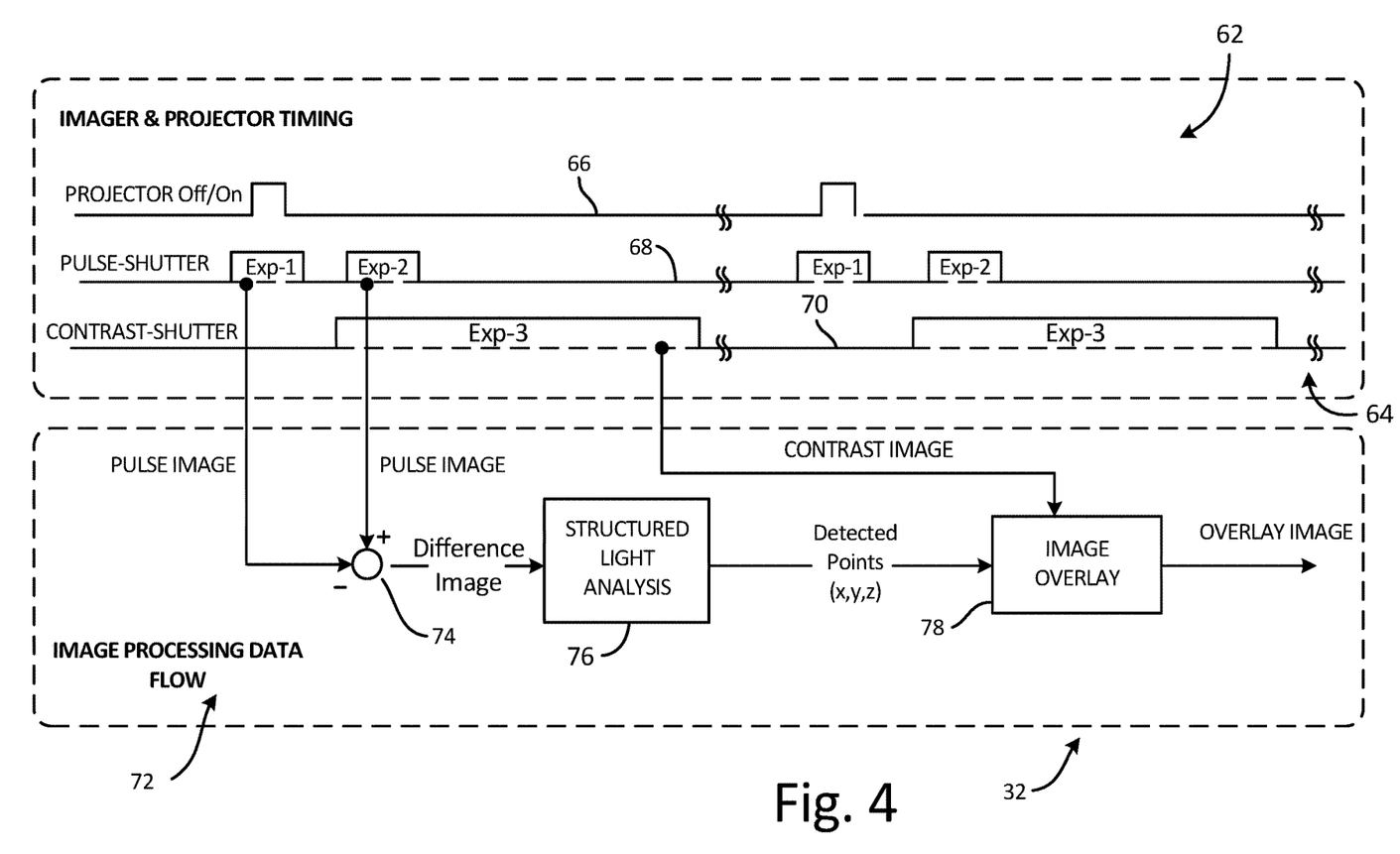
FIG. 4 is a timing diagram depicting the timing of various operations of the exemplary aircraft collision alerting system depicted in FIGS. 2-3.

FIG. 4 is a timing diagram depicting the timing of various operations of the exemplary aircraft collision alerting system depicted in FIGS. 2-3. In FIG. 4, timing diagram 62 has horizontal axis 64. Horizontal axis 64 corresponds to time. Timing diagram 62 includes light projector timing signal 66, pulse image exposure timing signal 68, and standard-contrast image exposure timing signal 70. Light projector timing signal 66 controls the projection of pulses of spatially-patterned light by infrared light projector(s) 34. Pulse image exposure timing signal 68 controls the timing of pulse image generation by camera(s) 36. Standard-contrast image exposure timing signal 68 controls the timing of standard-contrast image generation by camera(s) 36. Each of the control signals 66, 68 and 70 are depicted for two periodic cycles in timing diagram 62.

Each periodic cycle of timing diagram 62 depicts camera exposure timing signals that command camera(s) 36 to obtain three different images per periodic cycle. Camera(s) 36 is commanded to generate a first pulse image during a time span in which projector timing signal 66 commands infrared light projector(s) 34 to project pulses of spatially-patterned light upon the scene. Camera(s) 36 is commanded to generate a second pulse image during a time span in which projector timing signal 66 commands infrared light projector(s) 34 to be in an off state. Camera(s) 36 is commanded to generate a standard-contrast image during a time span in which projector timing signal 66 commands infrared light projector(s) 34 again to be in an off state. Exposure timing of the standard-contrast image may be increased to improve the quality of the standard-contrast image, for example.

FIG. 4 also depicts a simplified block diagram of a portion of aircraft collision alerting system 32 for the purpose of explaining how the three images captured by camera(s) 36 can be used to provide trajectory and/or range data to a pilot of an aircraft. Aircraft collision alerting system 32 includes difference image generator 74, structured-light analysis module 76 and image overlay engine 78. Difference image generator 74 generates an image corresponding to a difference between the first and second pulse images generated by camera(s) 36. Structured light analysis module 76 receives the generated difference image and calculates trajectory and/or range data based on the received difference image. Image overlay engine 78 receives the standard-contrast image generated by camera(s) 36 and annotates the received standard-contrast image with the calculated trajectory and/or range data received from structured light analysis module 76.

Figure 5:
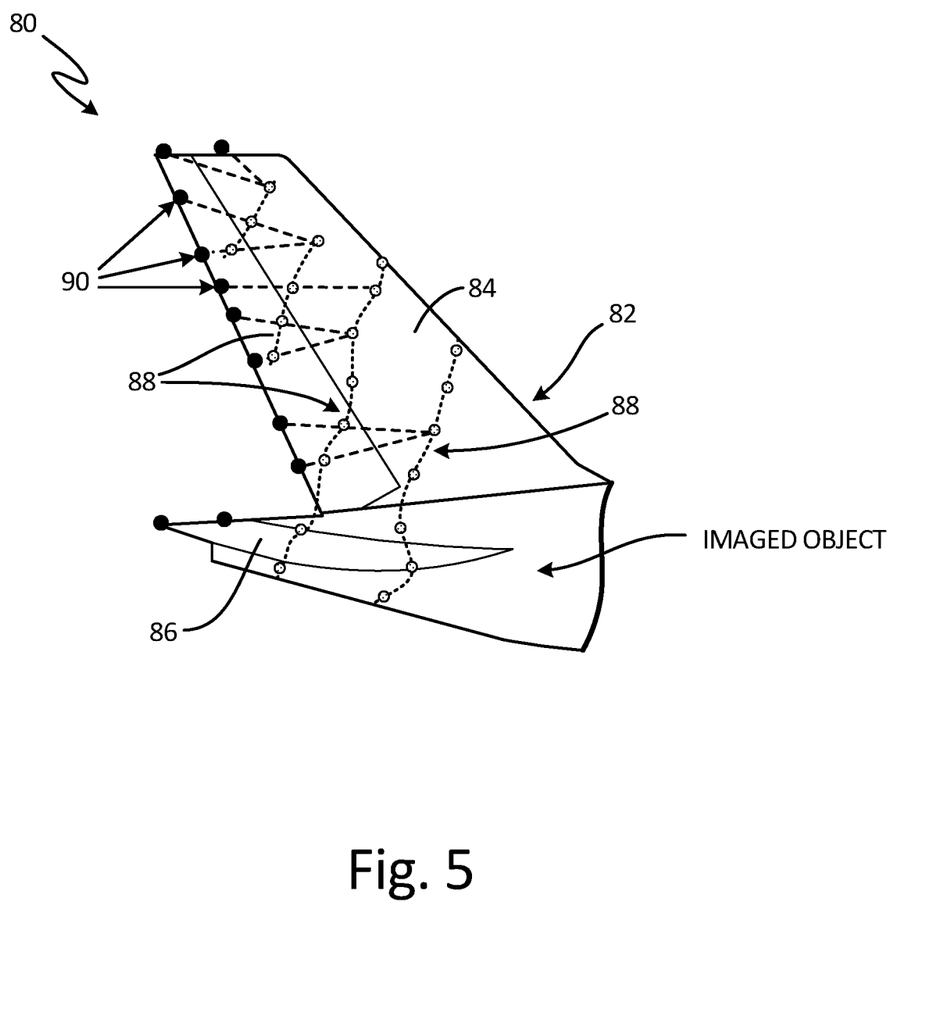
FIG. 5 is a schematic diagram depicting object range determination using both active and passive imaging.

FIG. 5 is a schematic diagram depicting object range determination using both active and passive imaging. In FIG. 5, camera image 80 of tail 82 of aircraft 14 external to taxiing aircraft 12 is shown. Camera image 80 is composed from intensity data of a two-dimensional array of light-sensitive pixels (not individually depicted). Tail 82 includes vertical stabilizer 84 and horizontal stabilizer 86. Vertical stabilizer 84 depicts features 88 of pulses of spatially-patterned light projected thereon. Features 88 are diagonal lines of light. Features 88 are imaged by a subset of the two-dimensional array of light-sensitive pixels composing the image. For each of the subset of the two-dimensional array of light-sensitive pixels containing the pulses of spatially-patterned light projected upon tail 82, a range value is calculated.

Between the subset of pixels that have calculated range values are pixels upon which the pulses of spatially-patterned light has not been projected. For some, if not all, of these pixels, range values can be calculated using the already calculated range values corresponding to nearby pixels. For example, range values can be calculated for the pixels determined to be boundary pixels of an object. Range values for boundary pixels 90 may be calculated by modeling the range variations within a single object as a polynomial function of spatial coordinates, for example. Such a model may be used to calculate range values using the pixel coordinates and corresponding range values of pixels having already calculated range values that reside within the object boundary associated with boundary pixels 90.

Various embodiments can use various configurations of spatially-patterned light having various features. For example, in some embodiments, vertical or diagonal lines can be projected upon a scene. In some embodiments, spots of light can be projected upon a scene. In an exemplary embodiment, both vertical lines and horizontal lines can be projected upon a scene, using projectors that are horizontally and/or vertically displaced, respectively, from the camera location.

The following are non-exclusive descriptions of possible embodiments of the present invention.

Apparatus and associated methods relate to a system for calculating trajectory and/or range data of object(s) external to an aircraft. The system includes a light projector configured to be mounted at a projector location on the aircraft and to project pulses of spatially-patterned light from the light projector onto a scene external to the aircraft, thereby providing rapidly-changing illumination of a spatially-patterned portion of the scene. The system includes a camera configured to be mounted at a camera location on the aircraft and to receive a portion of the projected pulses of spatially-patterned light reflected by the scene. The camera is further configured to focus the received portion onto a focal plane array comprising a plurality of light-sensitive pixels. The camera has a pulse-mode in which the camera forms a pulse image comprising pixel data generated by the plurality of light-sensitive pixels. The pixel data is indicative of a rate of change of light intensity focused thereon exceeding a predetermined threshold. The system also includes an image processor configured to identify pixel coordinates corresponding to a subset of the plurality of light-sensitive pixels indicative of the rate change of light intensity focused thereon exceeding a predetermined threshold. The image processor is further configured to calculate, based on the projector location of the light projector, the camera location of the camera and the identified pixel coordinates, trajectory and/or range data of object(s) in the scene from which the spatially-patterned light projected by the light projector is reflected.

The system of the preceding paragraph can optionally include, additionally and/or alternatively, any one or more of the following features, configurations and/or additional components:

A further embodiment of the foregoing system, wherein the camera is configured to form a first pulse image while the light projector is projecting a pulse of spatially-patterned light onto the scene.

A further embodiment of any of the foregoing systems, wherein the camera is configured to form a second pulse image while the light projector is not projecting a pulse of spatially-patterned light onto the scene.

A further embodiment of any of the foregoing systems, wherein the image processor is configured to generate a difference image based on a difference of the first and second pulse images.

A further embodiment of any of the foregoing systems, wherein the image processor is configured to control a rise time and/or a peak power of the projected pulses of spatially-patterned light.

A further embodiment of any of the foregoing systems, wherein the camera is further configured to form a standard-contrast image indicative of integrated light intensity over an exposure time.

A further embodiment of any of the foregoing systems, wherein the image processor is configured to generate a standard-contrast image while the light projector is not projecting a pulse of spatially patterned light onto the scene.

A further embodiment of any of the foregoing systems, wherein the spatially-patterned light comprises a series of spatially-separated lines or points of light.

A further embodiment of any of the foregoing systems, wherein the spatially-patterned light projected by the light projector comprises infrared light and the camera is an infrared camera and each of the plurality of light-sensitive pixels is sensitive to infrared light.

A further embodiment of any of the foregoing systems, wherein the spatially-patterned light projected by the light projector comprises infrared light having a wavelength corresponding to a lower solar intensity portion or to an atmospheric absorption band.

A further embodiment of any of the foregoing systems, further including a cockpit notification system configured to generate an alert signal if the calculated trajectory and/or range data of object(s) indicate that object(s) are within a collision zone or on a collision trajectory.

A further embodiment of any of the foregoing systems, wherein the cockpit notification system includes an audible alarm that is activated when the calculated trajectory and/or range data indicates one or more of the object(s) in the scene has a combination of an object range and an object direction relative to the aircraft corresponding to a risk of collision.

A further embodiment of any of the foregoing systems, wherein the cockpit notification system includes a display device configured to display the one or more images of the scene annotated with the calculated trajectory and/or range data.

In some embodiments, apparatus and associated methods relate to a method for generating an alert signal of a potential aircraft collision. The method includes projecting pulses of spatially-patterned light from a light projector onto a scene external to an aircraft, thereby providing pulsed illumination of a spatially-patterned portion of the scene. The spatially-patterned portion of the scene thereby receives a rapid change in illumination. The method includes receiving a portion of the projected pulses of spatially-patterned light reflected by the scene. The method includes focusing, by a camera, the received portion onto a focal plane array comprising a plurality of light-sensitive pixels. The method includes forming, by the camera, a pulse image indicative of a change of reflected light intensity exceeding a predetermined threshold. The pulse image includes pixel data generated by the plurality of light-sensitive pixels. The method includes identifying pixel coordinates corresponding to a subset of the plurality of light-sensitive pixels that are indicative of the rapid change of light intensity exceeding a predetermined threshold. The method includes calculating, based on a projector location of the light projector, a camera location of the camera and the identified pixel coordinates, trajectory and/or range data of object(s) in the scene from which the spatially-patterned light projected by the light projector is reflected. The method also includes outputting an alert signal if the calculated trajectory and/or range data of object(s) indicates one or more of the object(s) in the scene has a combination of a range and/or a trajectory relative to the aircraft corresponding to a risk of collision.

The method of the preceding paragraph can optionally include, additionally and/or alternatively, any one or more of the following features, configurations and/or additional components:

A further embodiment of the foregoing method, wherein the pulse image is a first pulse image. The method further includes forming, by the camera, a second pulse image indicative of a rapid change of reflected light intensity. The pulse image includes pixel data generated by the plurality of light-sensitive pixels. The first pulse image is formed when one of pulses of spatially-patterned light is projected onto the scene and the second pulse image is formed when none of the pulses of spatially-patterned light is projected onto the scene.

A further embodiment of any of the foregoing methods, further including generating a difference image based on a difference of the first and second pulse images.

A further embodiment of any of the foregoing methods, further including controlling a rise time and/or a peak power of the projected pulses of spatially-patterned light.

A further embodiment of any of the foregoing methods, further including activating an audible alarm in response to outputting the alert signal.

A further embodiment of any of the foregoing methods, further including forming, by the camera, a standard-contrast image indicative of integrated light intensity over an exposure time.

A further embodiment of any of the foregoing methods, further including displaying the standard-contrast image of the scene annotated with the calculated trajectory and/or range data.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for calculating trajectory and/or range data of object(s) external to an aircraft, the system comprising:
   a light projector configured to be mounted at a projector location on the aircraft and to project pulses of spatially-patterned light from the light projector onto a scene external to the aircraft, thereby providing rapidly-changing illumination of a spatially-patterned portion of the scene;
   a camera configured to be mounted at a camera location on the aircraft and to receive a portion of the projected pulses of spatially-patterned light reflected by the scene, and further configured to focus the received portion onto a focal plane array comprising a plurality of light-sensitive pixels, the camera having a pulse-mode in which the camera forms a pulse image comprising pixel data generated by the plurality of light-sensitive pixels, the pixel data indicative of a rate of change of light intensity focused thereon exceeding a predetermined threshold; and
   an image processor configured to identify pixel coordinates corresponding to a subset of the plurality of light-sensitive pixels indicative of the rate change of light intensity focused thereon exceeding the predetermined threshold, the identified pixel coordinates thereby corresponding to a subset of the plurality of light-sensitive pixels upon which the spatially-patterned light projected by the light projector and reflected from the spatially-patterned portion of the scene is focused, the image processor further configured to calculate, based on the projector location of the light projector, the camera location of the camera and the pixel coordinates so identified by the rate change of light intensity exceeding the predetermined threshold, trajectory and/or range data of object(s) in the scene from which the spatially-patterned light projected by the light projector is reflected.

2. The system of claim 1, wherein the camera is configured to form a first pulse image while the light projector is projecting a pulse of spatially-patterned light onto the scene.

3. The system of claim 2, wherein the camera is configured to form a second pulse image while the light projector is not projecting a pulse of spatially-patterned light onto the scene.

4. The system of claim 3, wherein the image processor is configured to generate a difference image based on a difference of the first and second pulse images.

5. The system of claim 1, wherein the image processor is configured to control a rise time and/or a peak power of the projected pulses of spatially-patterned light.

6. The system of claim 1, wherein the camera is further configured to form a standard-contrast image indicative of integrated light intensity over an exposure time.

7. The system of claim 6, wherein the image processor is configured to generate a standard-contrast image while the light projector is not projecting a pulse of spatially patterned light onto the scene.

8. The system of claim 1, wherein the spatially-patterned light comprises a series of spatially-separated lines or points of light.

9. The system of claim 1, wherein the spatially-patterned light projected by the light projector comprises infrared light and the camera is an infrared camera and each of the plurality of light-sensitive pixels is sensitive to infrared light.

10. The system of claim 9, wherein the spatially-patterned light projected by the light projector comprises infrared light having a wavelength corresponding to a lower solar intensity portion or to an atmospheric absorption band.

11. The system of claim 1, further comprising a cockpit notification system configured to generate an alert signal if the calculated trajectory and/or range data of object(s) indicate that object(s) are within a collision zone or on a collision trajectory.

12. The system of claim 11, wherein the cockpit notification system includes an audible alarm that is activated when the calculated trajectory and/or range data indicates one or more of the object(s) in the scene has a combination of an object range and an object direction relative to the aircraft corresponding to a risk of collision.

13. The system of claim 11, wherein the cockpit notification system includes a display device configured to display the one or more images of the scene annotated with the calculated trajectory and/or range data.

14. A method for generating an alert signal of a potential aircraft collision, the method comprising the steps of:
projecting pulses of spatially-patterned light from a light projector onto a scene external to an aircraft, thereby providing pulsed illumination of a spatially-patterned portion of the scene, the spatially-patterned portion of the scene thereby receiving a rapid change in illumination;
receiving a portion of the projected pulses of spatially-patterned light reflected by the scene;
focusing, by a camera, the received portion onto a focal plane array comprising a plurality of light-sensitive pixels;
forming, by the camera, a pulse image indicative of a change of reflected light intensity exceeding a predetermined threshold, the pulse image comprising pixel data generated by the plurality of light-sensitive pixels;
identifying pixel coordinates corresponding to a subset of the plurality of light-sensitive pixels that are indicative of the rapid change of light intensity exceeding the predetermined threshold, the identified pixel coordinates thereby corresponding to a subset of the plurality of light-sensitive pixels upon which the spatially-patterned light projected by the light projector and reflected from the spatially-patterned portion of the scene is focused;
calculating, based on a projector location of the light projector, a camera location of the camera and the pixel coordinates so identified by the rate change of light intensity exceeding the predetermined threshold, trajectory and/or range data of object(s) in the scene from which the spatially-patterned light projected by the light projector is reflected; and
outputting an alert signal if the calculated trajectory and/or range data of object(s) indicates one or more of the object(s) in the scene has a combination of a range and/or a trajectory relative to the aircraft corresponding to a risk of collision.

15. The method of claim 14, wherein the pulse image is a first pulse image, the method further comprising
forming, by the camera, a second pulse image indicative of a rapid change of reflected light intensity, the pulse image comprising pixel data generated by the plurality of light-sensitive pixels,
wherein the first pulse image is formed when one of pulses of spatially-patterned light is projected onto the scene and the second pulse image is formed when none of the pulses of spatially-patterned light is projected onto the scene.

16. The method of claim 15, further comprising:
generating a difference image based on a difference of the first and second pulse images.

17. The method of claim 16, further comprising:
controlling a rise time and/or a peak power of the projected pulses of spatially-patterned light.

18. The method of claim 14, further comprising:
activating an audible alarm in response to outputting the alert signal.

19. The method of claim 14, further comprising:
forming, by the camera, a standard-contrast image indicative of integrated light intensity over an exposure time.

20. The method of claim 14, further comprising:
displaying the standard-contrast image of the scene annotated with the calculated trajectory and/or range data.

* * * * *